June 25, 1957 G. A. WORN 2,797,018
PRESSURE HAND SEAL
Filed Sept. 24, 1954 2 Sheets-Sheet 1

INVENTOR
George A. Worn
BY
Nathaniel Ely
ATTORNEY

June 25, 1957  G. A. WORN  2,797,018
PRESSURE HAND SEAL
Filed Sept. 24, 1954  2 Sheets-Sheet 2

INVENTOR
George A. Worn
BY
Nathaniel Ely
ATTORNEY

United States Patent Office 2,797,018
Patented June 25, 1957

2,797,018

PRESSURE HEAD SEAL

George A. Worn, La Jolla, Calif., assignor to The Lummus Company, New York, N. Y., a corporation of Delaware Application September 24, 1954, Serial No. 458,055

9 Claims. (Cl. 220—46)

This invention relates to high pressure metallic receptacles and more particularly to sealing structures for sealing a removable closure to a wall of the receptacles. It is particularly applicable to high pressure heat exchangers, as an example, such as shown in the Gertzon Patent 2,268,507 issued December 30, 1941.

In the high pressure receptacles of this type, it was recognized that the effect of relatively high pressures (500 lbs. per square inch and higher) when applied to surfaces of considerable area (12 inches in diameter and greater), cause a high gross load which must be resisted by the cover holding bolts in addition to the tension required to suitably compress a gasket into pressure-tight condition. With very high pressures of several thousands of pounds per square inch or more it becomes almost impossible to seal such a receptacle for the lack of sufficient space for the necessarily large bolts.

Although remedies have been suggested for resisting the high gross load as for example by the shear keys of the Gertzon patent, all of the high pressure cover constructions have the gasket subjected directly or indirectly to the high internal pressure. In most all of these cases, difficulties of effective sealing still exist, not only because the gasket deforms under great load, but also because it is impossible to detect any specific point of leakage or to take any steps to correct it.

The problem of securing a closure cannot be independently considered from that of sealing. There is no such thing as an absolute securing of a removable plate or cover to another member when conditions of high temperature or high pressure or both exist. Mechanical clearances necessary for assembly are soon absorbed, and slight movements due to differences in coefficients of expansion result in severe misshaping of the gaskets used for sealing.

In the environment of a shear key holding a cover plate on a pressure vessel, my invention is primarily concerned with the formation of a one piece soft metal gasket in the shear-key receiving space in the pressure vessel wall so that self-sealing of the joint is obtained by the movement of the plate or cover under the influence of the internal forces which thus creates a barrier across the path of possible movement of fluid out of the vessel.

A specific object of my invention is to provide an improved type of closure member for a high pressure metallic receptacle in which the closure member is restrained from movement under pressure by a simple recessed key which transfers the gross load to the vessel wall, such key being removable only after release of the pressure and the removal of an interlocking element and in which the sealing is effected against fluid flow conditions by a continuous flexible gasket embracing the recessed key so that the gasket flows with the key and retainer for continuous sealing.

Further objects and advantages of my invention will appear from the following description of preferred forms of embodiment thereof taken in conjunction with the attached drawing in which.

Figure 2:
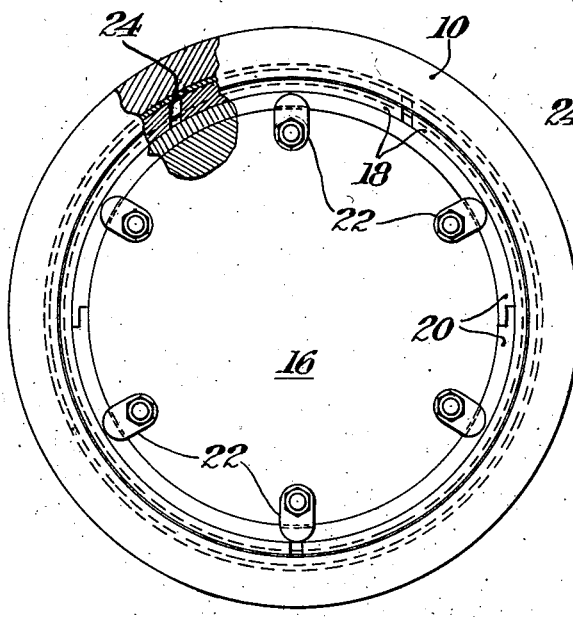
Fig. 2 is an end elevation of the construction shown in Fig. 1 and on a somewhat smaller scale.

For the purposes of describing my invention, reference is hereinafter made to a heat exchanger as a metallic receptacle having an annular wall or channel 10 adjacent to the pressure nozzle 12 which communicates with the interior of the receptacle. As shown in Fig. 2, this wall 10 is to receive a closure member or cover 16.

As heretofore noted, pressure vessels such as heat exchangers having substantial internal pressures and with covers of relatively large size are subjected to high hydrostatic loading and with internal pressures of 500 to 10,000 pounds per square inch or more and with diameters in the order of 12 inches to 50 inches or more, the total load can be in the order of millions of pounds. It has thus been found desirable to directly resist the load on the cover through the use of shear keys 18, the projecting portion 18a of which extends into a recess 10a on the interior surface of the wall 10.

The key member 18 is preferably a split ring as shown in Fig. 2 which may be assembled by insertion of the pieces in the recessed annular wall portion 16a of the cover 16. After being moved radially outward into the desired holding position with the projections 18a engaging the wall recess 10c, the keys are retained by a retaining ring 20 which fits between the projecting arm of the key 18 and the abutting wall of the cover 16. The ring 20 may be held in place by a retainer 22 of any desired type.

It will be appreciated that the spacing between the maximum diameter 16b of the cover and the inner surface 10b of the wall or channel 10 required for assembly of the parts is such that some leakage would result and it is necessary to seal this annular space. In the past, this has been accomplished by either an external or an interior gasket arrangement each of which have objectionable mechanical difficulties.

Figure 1:
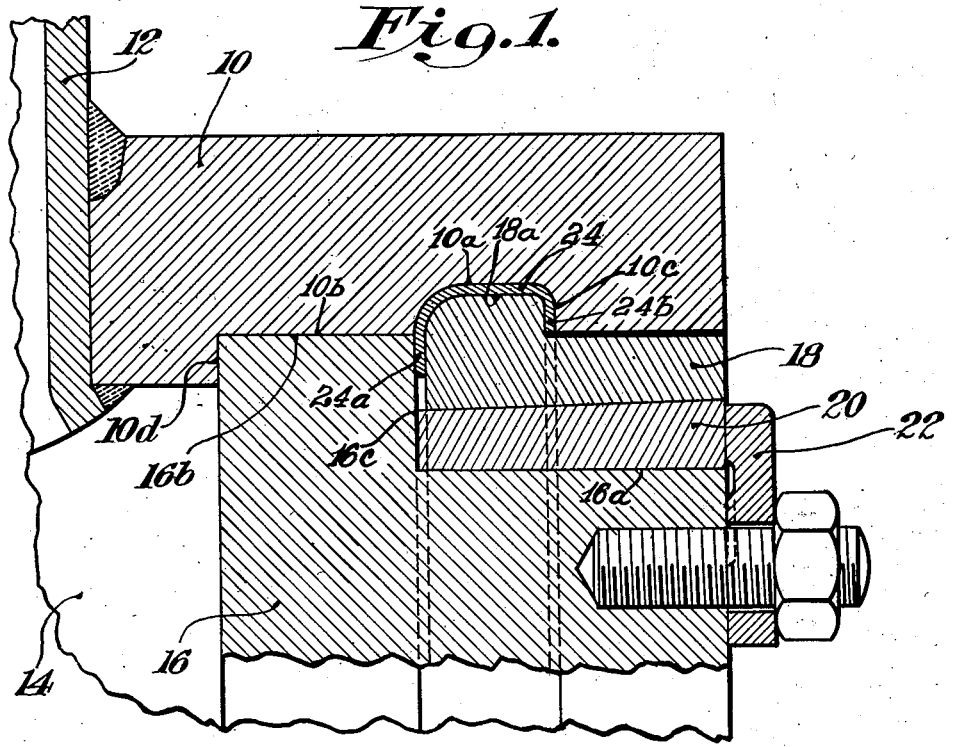
Fig. 1 is a vertical section through the end of a metallic receptacle showing the closure member in pressure-tight sealed relation to the wall.
Figure 3:
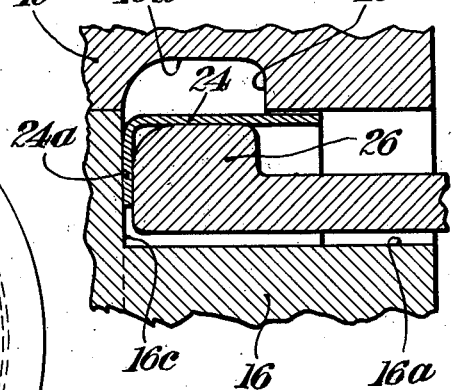
Fig. 3 is a detailed cross section of the receptacle showing the manner of forming the gasket.

In accordance with my invention, I propose to use a channel shaped gasket 24 which is formed into the C-shape cross-section annular recess 10a in the closure wall 10 as by a forming tool 26 as shown in Fig. 3. To form the gasket to the exact shape desired, the gasket 24 is first inserted adjacent the channel as indicated. The forming tool 26 is then suitably rotated around the axis of the heat exchanger channel to force the gasket 24 into the position as shown in Fig. 1 wherein the base 24a overlaps the outer face 16c of the cover 16 as well as a part of the adjacent surface of the pressure vessel wall. In addition, the gasket extends axially along the length of the pressure vessel as forced into the base of the recess 10a. The opposite end of the gasket then projects outwardly along the load resisting surface 10c of the wall of the pressure vessel.

Following formation of the gasket 24, the forming tool is removed and the key member 18 is inserted into the gasket with the result that the gasket closely embraces the projecting portions 18a of the key mmeber. Pressures above atmospheric on the inside chamber 14 which force the cover 16 outward along the vessel wall will thus force the cover face 16c against the inner surface 24a of the gasket and thence against the key 18. At the same time, the key 18 is forced against the gasket edge 24b which in turn seals against the surface 10c on the outer edge of the channel 10a in the wall 10. The vessel wall 10 may be provided with an internal shoulder 10d which is adapted to prevent the cover 16 from falling into the recess 14.

Figure 4:
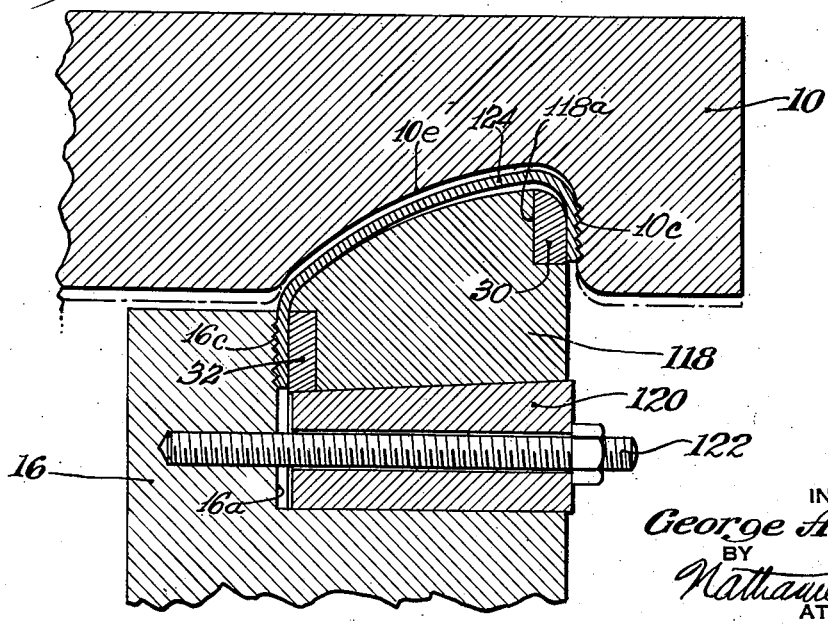
Fig. 4 is a vertical section through the end of a pressure vessel showing a modified form of seal and a variation of the key design.

If the heat exchanger is primarily adapted for feed water heaters, wherein temperatures in the order of 1000° F. are often reached with the high pressures heretofore mentioned, I prefer to use the construction shown in Fig. 4. In this construction the shell or wall is indicated at 10 and cover or closure at 16. A sealing gasket 124 embraces projecting portions of split keys 118. These are of the type previously indicated. They are retained in the recess 16a in the cover 16 by the retaining ring 120 and this is held in position by studs 122.

In this construction, however, I provide special hardened rings 30 and 32 adjacent the terminal sealing surfaces of the gasket 124. The outer ring 30 is a snap ring which is adapted to be inserted under the shoulder 10c of the cover and fits within an appropriate recess 118a in the key ring 118. Ring 32, on the other hand, may be a solid ring and is adapted to overlie the sealing surface 16c of the cover 16. These rings provide approximately an unbroken surface backing up against the gasket to bridge the cuts in the key ring which make the key ring sectional for inserting and removing.

Under high temperature and pressure conditions, the vessel wall 10 tends to expand to a greater diameter which is shown at 10e in exaggerated position in Fig. 4. At the same time gasket 124 also expands. Upon release of pressure and return of temperature to normal, the gasket 124 will approximately return to the original position. Preferably the sealing surfaces 10c and 16c are serrated and in such case the repeated on and off duty conditions, do not break the seals on the serrated faces but sliding can occur between the other faces.

It will be seen that this construction forms a completely gas-tight seal which will be improved by the pressure and will be tight through repeated applications of pressure and reductions of pressure.

A substantial advantage also results from the use of an internal gasket of this type in that it is free from accidental destruction, it does not project beyond the end of the vessel wall and it requires no securing means other than the keys which are used for shear resistance of the cover and are suitably secured against displacement. Such a construction is thus much less costly and is more effective and actually less expensive in manufacture and maintenance.

Figure 5:
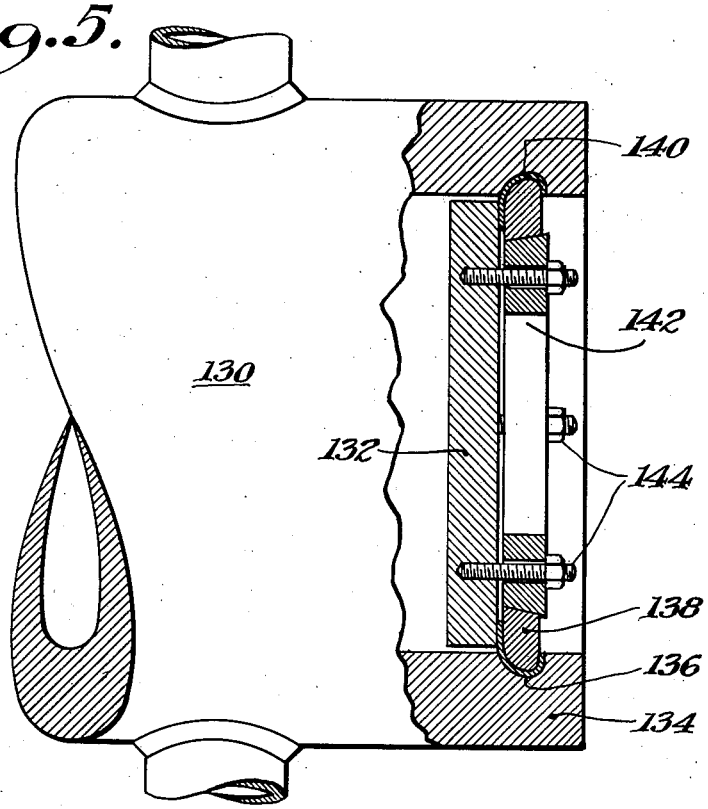
Fig. 5 is an elevation with parts in section showing a still further modified form of construction.

A modified form of construction is shown in Figure 5 in which the pressure vessel generally indicated at 130 is provided with a cover 132 which is adapted to seal the opening.

In this construction a wall 134 surrounding the opening is provided with the recess 136 of an annular type which is adapted to receive a projecting key ring 138 which is of a split nature and adapted to have a seal portion entering into annular recess 136 and overlying the cover 132.

A gasket 140 extends into the annular channel 136 and also overlies the cover 132 in such a manner that pressure on the cover tending to force the cover outward will tend to compress the gasket 140 against the base of the shear key ring 138 which in turn will be resisted by the outer face of the annular channel and the surrounding portion of the gasket. The edges of the gasket and the adjacent faces will be serrated as shown in Figure 4 to assure absolute tightness of joint irrespective of movement due to temperature or pressure variations. Alternatively the edges of the gasket may be welded to the vessel wall on one side and to the cover after emplacement on the other side.

In this construction the split ring 138 is adapted to be held in permanent position by the solid ring 142 which in turn is secured to the cover 132 by securing means 144.

Such a construction is somewhat cheaper than the prior constructions in that the cover is designed for its required thickness to resist the pressures involved and no provision need be made for the retaining portion which serves as the backing in Figures 1-4.

It will be appreciated that the expansion required to force the split ring 138 into position can be accomplished by any suitable expansion device.

While I have shown and described preferred forms of embodiment of my invention, I am aware that other modifications may have to be made thereon and I, therefore, desire a broad interpretation of the claims appended thereafter.

I claim:

1. A pressure vessel of the class described having an opening in the wall thereof, said wall having an inwardly facing circumferential groove adjacent said opening, a cover for said opening, a shear ring carried by said cover and having a portion projecting into the circumferential groove in the vessel wall, means to retain said ring in shear relation between said cover and said vessel wall, and a C-shaped gasket surrounding and closely embracing said projecting portion, said gasket positioned between the shear ring and the cover at its inner edge and the shear ring and outer surface of said groove on the other edge whereby pressure tight sealing is established between the cover and the vessel.

2. A pressure vessel of the class described in claim 1 in which the gasket is circumferentially continuous.

3. A pressure vessel of the class described in claim 1 in which the shear ring is segmental.

4. A pressure vessel of the class described in claim 1 in which the shear ring is split.

5. A pressure vessel of the class described in claim 1 in which the retaining means is removable from the cover.

6. A pressure vessel of the class described having a wall surrounding an opening therein, said wall having an internal circumferential shear resisting groove surrounding said opening, a cover for said opening, said cover having a portion of reduced diameter overlapping said circumferential groove and forming an annular channel between the wall of the cover and the wall of the vessel, a plurality of segmental shear keys in said annular channel, the shear portions of said keys projecting into the circumferential groove in the vessel wall, a retaining ring between the reduced diameter portion of the cover and the portion of the keys behind the shear portion to retain the keys in their shear relation, said retaining ring extending to the outer face of the cover and, with the shear keys, filling the annular recess, and a C-shaped gasket surrounding the outside of the shear portion of the shear keys, the edges of the gasket overlying on one edge, the cover, and on the other edge, the shear resisting groove whereby movement of the cover will establish pressure tight sealing between the cover and the gasket which is resisted by the shear keys and between the shear keys and the shear resisting groove, and means to prevent removal of the retaining ring, the gasket forming a continuous flexible connection between the cover and the channel.

7. In combination, a closure member for a high pressure metallic receptacle, said receptacle having an annular wall encircling an opening and within which said closure member is adapted to freely move when the pressure on the inside of the receptacle is substantially the same as the outside, said wall having an annular recess which is open on the inside, a sectional key member having an arm section which extends generally parallel to the channel wall and a projecting portion that substantially fills said annular recess, said closure member having a recess open from the outside, the construction being such that after the closure member is moved into closing position, the sectional key member is insertable through the recess in the closure member so that the projecting portion is insertable into the recess in the wall of the channel, such key member overlying a portion of the closure member to transmit gas pressure within the receptacle through the closure member and the key member to the channel wall, means to resist radial inward movement of the sectional key member, and gasket means to gas seal the clearance space between the closure member and the vessel wall, said gasket means being of flexible material adapted to be spun into the channel wall recess and to embrace the projecting portion of the sectional key member, said gasket means overlying the sectional key adjacent the point of impact of the closure to make a first seal with the closure, said gasket means making a second seal between another surface of the sectional key and a reacting portion of the channel wall recess.

8. A pressure vessel of the class described having an opening in the wall thereof, said wall having an inwardly facing circumferential groove adjacent said opening, a cover for said opening, said cover having its outer peripheral edge adjacent said wall at the inner edge of said groove, a shear ring carried by said cover and having a portion projecting into said groove, means to retain said ring in shear relation between said cover and said vessel wall, and a C-shaped gasket surrounding and closely embracing the projecting portion of said ring, said gasket positioned between the shear ring and the cover at its inner edge and the shear ring and outer surface of said groove on the other edge whereby pressure tight sealing is established between the cover and the vessel.

9. A pressure vessel of the class described having an opening in the wall thereof, said wall having an inwardly facing circumferential groove adjacent said opening, a cover for said opening, said cover having its outer peripheral edge adjacent said wall at the inner edge of said groove, a shear ring carried by said cover and having a portion projecting into said groove, a retaining ring positioned on said cover to resist radially inward movement of the shear ring and to retain it in its shear relation between said cover and said vessel wall, and a flexible C-shaped gasket surrounding and embracing the projecting portion of said shear ring to fluid seal the clearance space between the cover and the vessel, said gasket overlying the shear ring adjacent the point of impact of the cover to make a first seal with the cover and said gasket making a second seal between the shear ring and the vessel wall at the point of impact on the circumferential groove therein.

References Cited in the file of this patent

UNITED STATES PATENTS

| | | |
|---|---|---|
| 1,109,262 | Tackney | Sept. 1, 1914 |
| 2,016,228 | Clausen | Oct. 1, 1935 |
| 2,214,732 | Kraft | Sept. 17, 1940 |
| 2,665,877 | Macgregor | Jan. 12, 1954 |

FOREIGN PATENTS

| | | |
|---|---|---|
| 581,087 | France | Sept. 19, 1924 |